(No Model.)

3 Sheets—Sheet 1.

G. COTTRELL.
GRAIN DRIER.

No. 322,092. Patented July 14, 1885.

Witnesses,
Geo H Strong
[signature]

Inventor,
Geo Cottrell
By Dewey & Co.
Attorneys (No Model.)  3 Sheets—Sheet 2.

G. COTTRELL.
GRAIN DRIER.

No. 322,092. Patented July 14, 1885.

Witnesses,
Geo. H. Strong.
J. S. Nourse.

Inventor,
Geo Cottrell
By Dewey & Co.
Attorneys

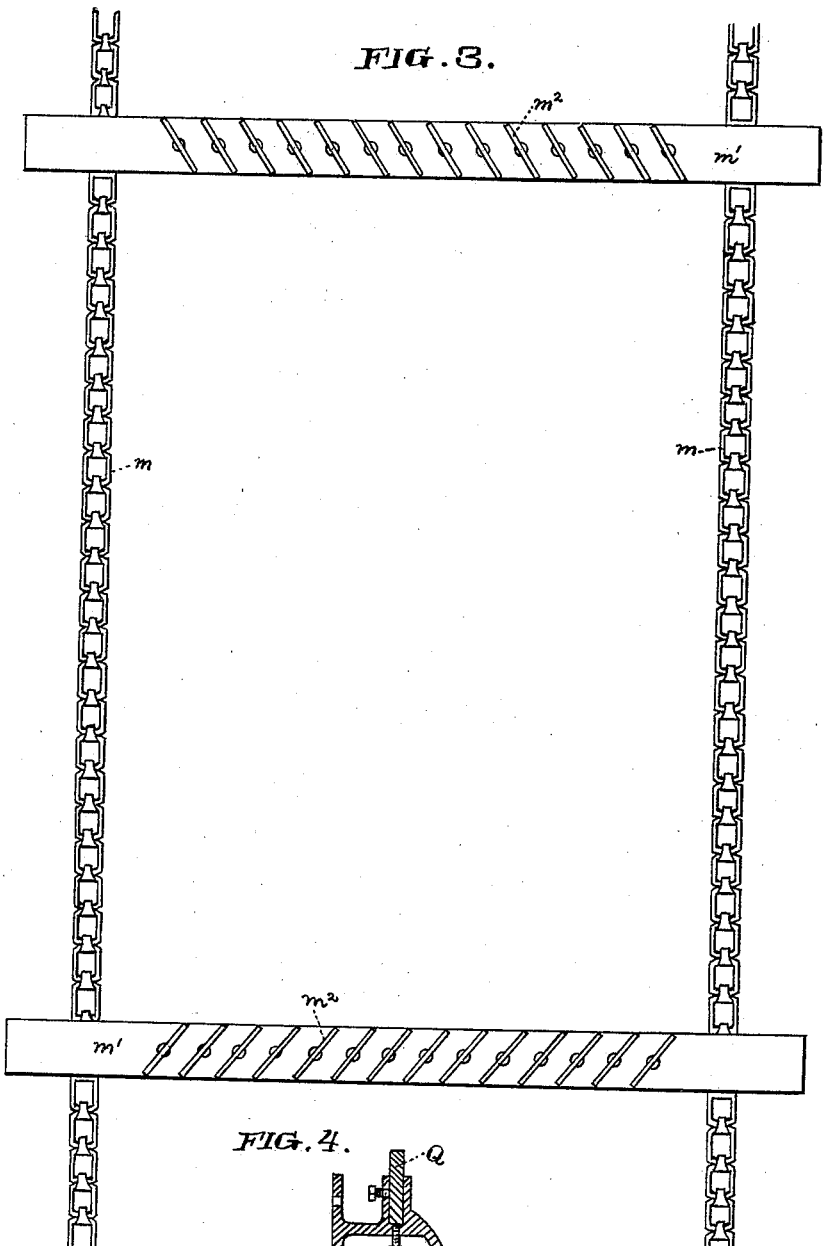

UNITED STATES PATENT OFFICE.

GEORGE COTTRELL, OF SAN FRANCISCO, CALIFORNIA.

GRAIN-DRIER.

SPECIFICATION forming part of Letters Patent No. 322,092, dated July 14, 1885.

Application filed January 24, 1885. (No model.)

*To all whom it may concern:*

Be it known that I, GEORGE COTTRELL, of the city and county of San Francisco, and State of California, have invented an Improvement in Drying-Kilns; and I hereby declare the following to be a full, clear, and exact description thereof.

My invention relates to a new and useful drying-kiln specially intended for drying and cooking oats; and my invention consists in an upper chamber or hearth having for a bottom a steam-pan, a lower chamber or hearth communicating with the upper and having a hot-air pan for a bottom, and peculiar endless and adjustable rakes, one in each compartment.

It consists further in an adjustable feed-hopper, the construction of the rakes, and means for adjusting them, means for adjusting the steam and hot-air pans, and in the general arrangement of the kiln, all of which I shall hereinafter fully describe.

The object of my invention is to provide a simple and effective drier for oats.

Figure 1:
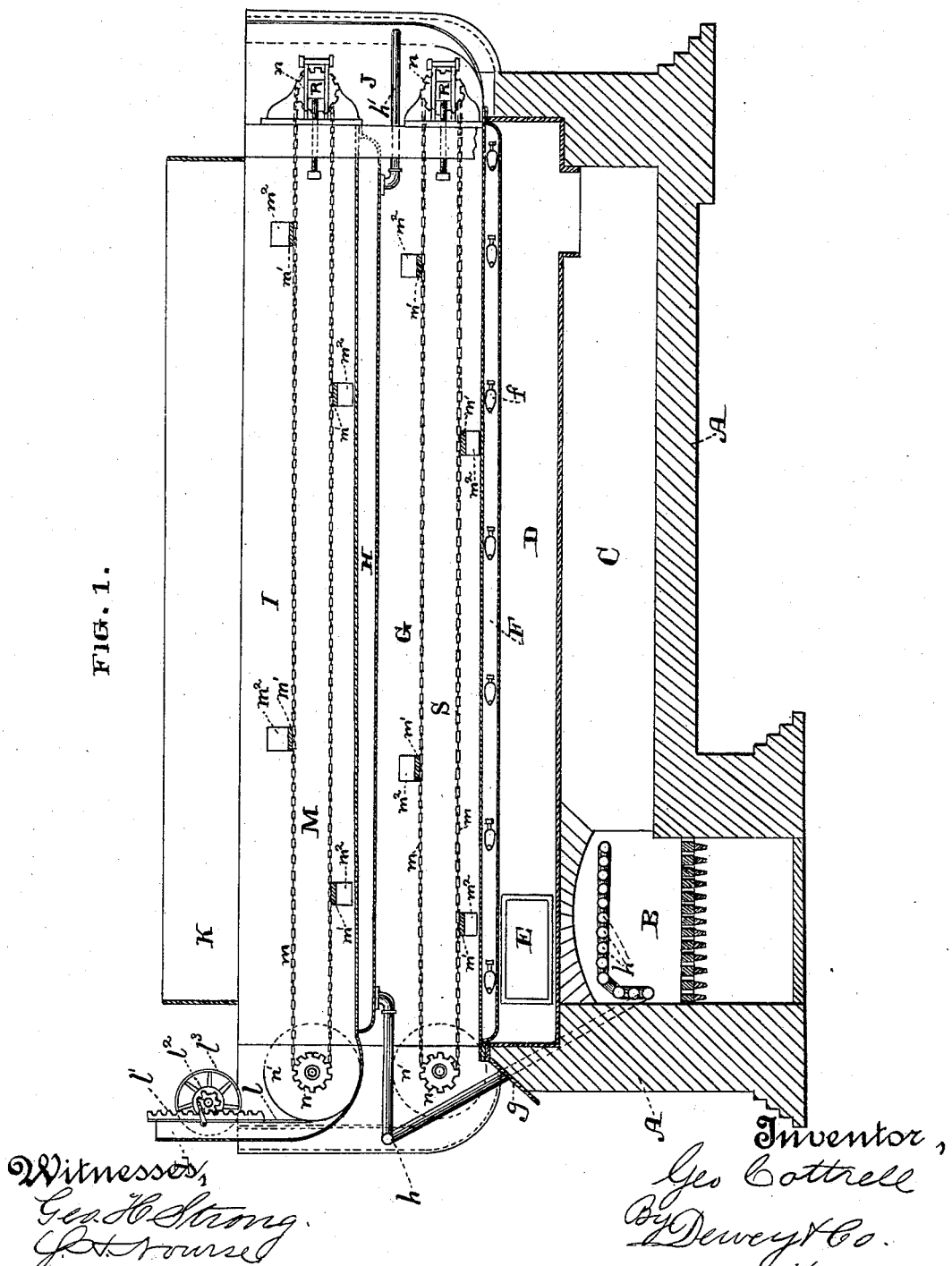
Figure 2:
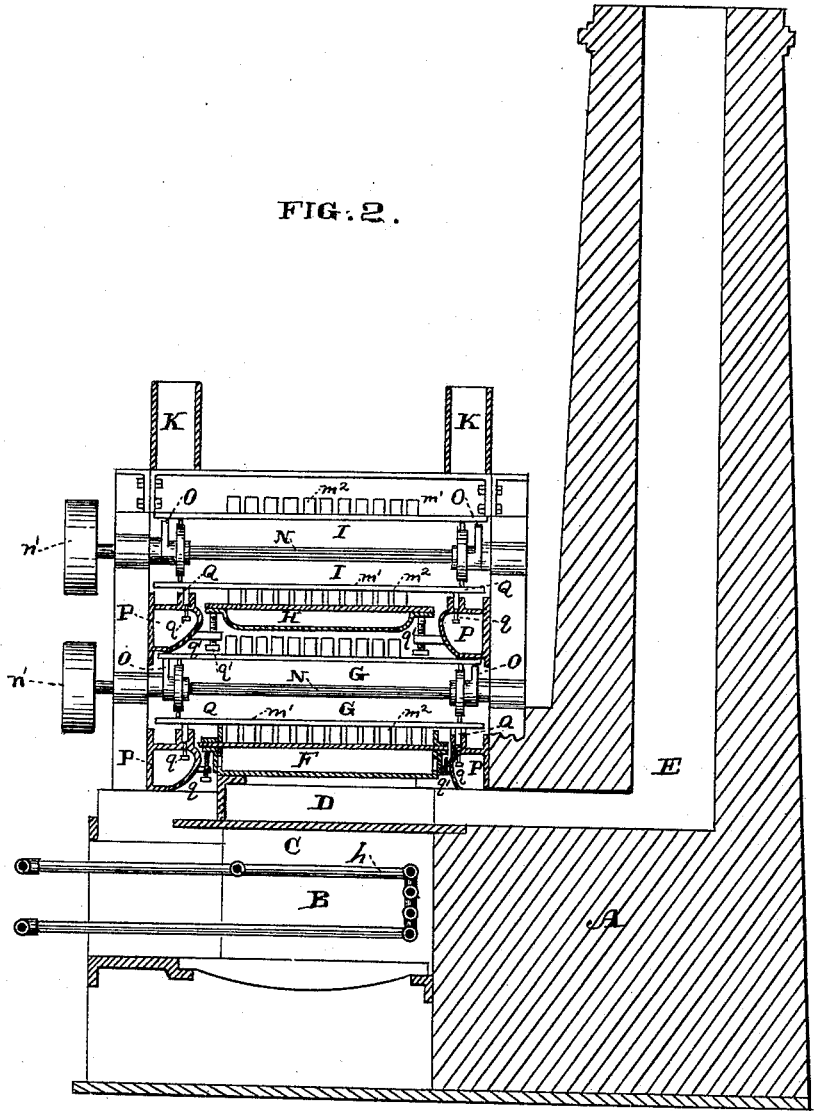

Referring to the accompanying drawings, Figure 1 is a longitudinal vertical section of my drying-kiln. Fig. 2 is a vertical cross-section of same. Fig. 3 is a plan of a portion of the rake, showing the oppositely-inclined flanges or teeth of the cross-strips. Fig. 4 is a vertical section of one of the brackets P, showing in detail the adjustive means.

A is the shell of the furnace. B is its fire-box, which communicates with the lower fire-chamber, C, above which and communicating therewith is the upper fire-chamber, D, which communicates with the flue or chimney E, by which the products of combustion escape.

Above the upper fire-chamber is a hot-air pan, F, which forms the bottom of the lower chamber or hearth, G. The hot-air pan is heated directly by the fire-chamber D, and it is provided with escape-valves $f$, for the purpose of regulating the temperature of the pan.

At one end of the hearth G is the discharge $g$. Above the hearth G is a steam-pan, H, which forms the bottom or floor of the upper chamber or hearth, I. One end of this chamber is connected by a passage, J, with the end of the lower chamber.

The steam-pan is supplied by means of a steam-pipe, $h$, which is coiled within the fire-box, whereby its steam is superheated and is admitted in this condition to the steam-pan. The other end of the steam-pan is provided with a waste-pipe, $h'$.

Above the upper hearth and communicating therewith are the ventilators K.

At the forward end of the upper hearth is a hopper, L, communicating with said hearth and provided with a gate, $l$, which is adapted to be vertically adjusted by means of a rack, $l'$, and a pinion, $l^2$, operated by a crank-wheel, $l^3$. By the vertical adjustment of this gate the quantity of oats fed to the upper hearth is duly regulated.

Within the upper hearth is a rake, which is represented generally by the letter M. This rake consists of two endless side chains, $m$, between which extend cross-strips $m'$ at suitable intervals. On these cross-strips are secured flanges or teeth $m^2$, which are spaced. Those upon each cross-strip lie parallel with each other, but are set at an opposite angle to the flanges upon the succeeding cross-strip, as is shown in Fig. 3.

The rake is mounted upon chain-pulleys $n$ upon driving-shafts N, mounted in the ends of the hearth, and are driven by means of a pulley, $n'$, upon one of the shafts.

The upper fold of the endless rake is supported by means of longitudinal bars, O, (shown in Fig. 2,) which bear under the cross-strips, while the lower fold is supported by the following means: Secured to the inner walls of the side of the hearth are brackets P. (Shown in detail in Fig. 4.) In the tops of these brackets are longitudinal bars Q, which bear under the projecting ends of the cross-strips of the rake and are vertically adjusted by means of screws $q$, whereby the flanges or teeth of the rake are properly separated from the floor of the hearth. The steam-pan itself is also vertically adjusted by means of screws $q'$, which bear under and support said pan. Thus by the two adjustments, the one of the rake and the other of the steam-pan, the flanges or teeth of the rake may be brought into the proper relation with the steam-pan, which forms the floor of the hearth.

R are adjustable sliding boxes at one end, by which the slack of the endless rake is taken up.

The lower hearth has a rake, S, which is constructed similarly to the rake M above, and bears the same relation to the lower hearth that the rake M does to the upper hearth, being mounted in the same manner and adapted to be adjusted similarly, the only difference being that the revolution of the lower rake is opposite to that of the upper rake.

The hot-air pan F is adjusted in a similar manner to the steam-pan H—that is to say, by means of screws $q'$ in brackets P, which are secured to the inner side of the walls of the hearth.

The operation of the device is as follows: The oats are admitted through the hopper L, the gate of which is adjusted to allow a stated and suitable quantity to pass down. As the cross-strips with their flanges or teeth move in the direction of the hopper they come in contact with the oats, and the flanges being set at an angle they move the oats a slight distance forward and to one side before they pass through them; the next cross-strip then coming on, its flanges being set at an opposite angle, the oats are thereby moved over to the first side and at the same time advanced a little. Thus by the continual contact of the oppositely-inclined flanges or teeth the oats are moved from one side to the other over the steam-pan, and at the passage of each set of flanges they are also advanced slightly. During the course of their travel over the steam-pan they are dried, most of the moisture being taken out, and they are prepared properly for the greater or "cooking" heat, as it is technically called, of the lower hearth. When the oats reach the end of the upper hearth, they drop down through the passage J and are met by the oppositely-moving lower rake, S, which advances them slowly over the hot-air pan forming the floor of the lower hearth until they reach the passage $g$. In this lower hearth they are cooked, and the operation is completed.

The superheated steam admitted to the pan H is more advantageous for the purpose of drying than if it were admitted wet.

The travel of the oats through the hearths may be regulated by regulating the speed of the rakes or by varying the inclination of the flanges or teeth. When these latter are set at a small angle, they advance the oats less than when set at a greater angle.

Although I have shown but two hearths, it is obvious that I may increase their number, if necessary.

Having thus described my invention, what I claim as new, and desire to secure by Letters Patent, is—

1. In an oat-drying kiln, the chamber or hearth I, having a suitable rake for stirring and advancing the oats, in combination with the steam-pan H under the hearth, and the steam-pipe $h$, coiled in the fire-chamber and connecting with the steam-pan by which superheated steam is admitted to the pan, substantially as herein described.

2. In an oat-drying kiln, the chamber or hearth I, having a suitable endless traveling rake for stirring and advancing the oats, and the steam-pan H under said hearth, in combination with the underlying chamber or hearth G, communicating with hearth I and having an endless traveling rake for stirring and advancing the oats, and the hot-air pan F under the lower hearth, substantially as herein described.

3. In an oat-drying kiln, the chamber or hearth G, having an endless traveling rake for stirring and advancing the oats, in combination with the hot-air pan F under said hearth, substantially as herein described.

4. In an oat-drying kiln, the chamber or hearth G, having a rake for stirring and advancing the oats, in combination with underlying hot-air pan F and the flue D under the pan, substantially as herein described.

5. In an oat-drying kiln, the endless traveling rakes M S, having cross-strips $m'$, with spaced flanges or teeth $m^2$, the flanges of one strip being set at an opposite angle to those of the succeeding strip, substantially as and for the purpose herein described.

6. In an oat-drying kiln, the endless traveling rakes M S, consisting of endless side chains $m$ and transverse strips $m'$, with spaced flanges or teeth $m^2$, the flanges of one strip being set at an opposite angle to those of the succeeding strip, substantially as and for the purpose herein described.

7. In an oat-drying kiln, a chamber or hearth in which the oats lie, in combination with an endless traveling rake, consisting of side chains mounted on pulleys in the chamber, and cross-strips having spaced flanges or teeth moving over the bottom or floor of the chamber, the flanges on one strip being set at an opposite angle to those of the succeeding strip, substantially as and for the purpose herein described.

8. In an oat-drying kiln, the rake M in a chamber or hearth, said rake having cross-strips $m'$ with spaced flanges or teeth $m^2$, set at an opposite angle on contiguous strips, for the purpose described, in combination with the brackets P on the inner walls of the chamber, the longitudinal support-bars Q, carried by the brackets and bearing under the cross-strips, and the screws $q$, by which the bars are vertically adjusted to adjust the rake, substantially as herein described.

9. In an oat-drying kiln, the endless traveling rake M, mounted on suitable pulleys in a chamber or hearth, said rake consisting of side chains $m$, cross-strips $m'$, having spaced flanges or teeth $m^2$, set at an opposite angle on contiguous strips, for the purpose described, in combination with the vertically-adjustable support-bars Q, bearing under the strips of the lower fold, and the support-bars O, bearing under the strips of the upper fold, substantially as and for the purpose herein described.

10. In an oat-drying kiln, a chamber or hearth in which the oats lie and a vertically-adjustable heating-pan forming the bottom or floor of the hearth, in combination with a vertically-adjustable rake consisting of side chains $m$ and cross-strips $m'$, having spaced flanges or teeth $m^2$, set at an opposite angle on contiguous strips, substantially as and for the purpose herein described.

11. In an oat-drying kiln, a chamber or hearth in which the oats lie having a heating-pan for a floor, and an endless rake within the hearth, consisting of side chains $m$, cross-strips $m'$, with angled flanges or teeth $m^2$, as described, in combination with the brackets P in the walls of the hearth, the vertically-adjustable support-bars Q, carried by the brackets and adapted to adjust the rake, and the set-screws $q'$ in the brackets adapted to adjust the heating-pan, substantially as herein described.

12. In an oat-drying kiln, the upper chamber or hearth, I, and the endless rake M therein, in combination with the feed-hopper L, having a vertically-adjustable gate, $l$, a rack, $l'$, a pinion, $l^2$, and a crank-wheel, $l^3$, substantially as herein described.

GEORGE COTTRELL.

Witnesses:
C. D. COLE.
J. H. BLOOD.